United States Patent
Chou et al.

(10) Patent No.: US 12,276,786 B2
(45) Date of Patent: Apr. 15, 2025

(54) SELF-ILLUMINATING DISTORTION HARP

(71) Applicant: GM Cruise Holdings LLC, San Francisco, CA (US)

(72) Inventors: Daniel Chou, Sunnyvale, CA (US); Yongjun Wang, Pleasanton, CA (US); Nigel Rodrigues, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 695 days.

(21) Appl. No.: 17/550,674

(22) Filed: Dec. 14, 2021

(65) Prior Publication Data

US 2023/0185085 A1    Jun. 15, 2023

(51) Int. Cl.
*G02B 27/00* (2006.01)
*F21V 8/00* (2006.01)

(52) U.S. Cl.
CPC ......... *G02B 27/0025* (2013.01); *G02B 6/001* (2013.01)

(58) Field of Classification Search
CPC .............................. G02B 6/001; G02B 27/0025
See application file for complete search history.

(56) References Cited

U.S. PATENT DOCUMENTS

| | | | | |
|---|---|---|---|---|
| 6,104,371 A * | 8/2000 | Wang | ..................... | G02B 6/001 345/32 |
| 10,989,868 B1 * | 4/2021 | Zou | ..................... | D21H 21/30 |
| 11,460,855 B1 * | 10/2022 | Lim | ..................... | G05D 1/024 |
| 2006/0194487 A1 * | 8/2006 | Ouderkirk | ..................... | G02B 5/3008 428/397 |
| 2007/0122103 A1 * | 5/2007 | Yamazaki | ..................... | G02B 6/001 385/32 |
| 2010/0033988 A1 * | 2/2010 | Chiu | ..................... | G02B 6/0065 362/628 |
| 2010/0066254 A1 * | 3/2010 | Ott | ..................... | G02B 6/0003 315/129 |
| 2010/0124243 A1 * | 5/2010 | Hussell | ..................... | F21V 29/70 372/45.01 |
| 2011/0292676 A1 * | 12/2011 | Weiner | ..................... | F21K 9/61 362/558 |
| 2011/0293219 A1 * | 12/2011 | Weiner | ..................... | G02B 6/001 385/31 |
| 2014/0355295 A1 * | 12/2014 | Kuchinsky | ..................... | G02B 6/001 362/558 |
| 2016/0054517 A1 * | 2/2016 | Okimoto | ..................... | G02B 6/0055 349/67 |
| 2016/0231585 A1 * | 8/2016 | Bauco | ..................... | G02B 6/001 |
| 2016/0327383 A1 * | 11/2016 | Becker | ..................... | G01B 11/25 |

(Continued)

*Primary Examiner* — Bao-Luan Q Le (57) ABSTRACT

Apparatus and methods are provided for using a self-illuminating harp to calibrate for distortion. In particular, apparatus, methods and systems are provided for imaging and analyzing self-illuminated harp in order to correct for lens distortion. In various implementations, an array of media is strung plumb which resembles a harp. The media can be light fibers or other suitable material which can be strung in a straight line. The cores of translucent fibers are illuminated. These are configured to scatter light throughout their bulk which escapes the core by egressing along the length of fiber. This light produces plumb lines which can be imaged, analyzed and model. In some implementations, imaging is performed by rotation to include a full FOV.

19 Claims, 9 Drawing Sheets

(56) References Cited

U.S. PATENT DOCUMENTS

| | | | | |
|---|---|---|---|---|
| 2016/0349425 A1* | 12/2016 | Chang | ............ | G02B 6/0006 |
| 2017/0090116 A1* | 3/2017 | Lee | ............ | G02B 6/0006 |
| 2017/0328989 A1* | 11/2017 | Bartlett | ............ | G01S 17/42 |
| 2018/0150058 A1* | 5/2018 | Shapiro | ............ | G06T 7/40 |
| 2018/0329129 A1* | 11/2018 | Tjin | ............ | G02B 6/003 |
| 2019/0131921 A1* | 5/2019 | Bae | ............ | H02S 40/425 |
| 2019/0204425 A1* | 7/2019 | Abari | ............ | G01S 7/497 |
| 2019/0204427 A1* | 7/2019 | Abari | ............ | G01S 17/86 |
| 2020/0116558 A1* | 4/2020 | Pacala | ............ | G01S 7/4815 |
| 2020/0120299 A1* | 4/2020 | Li | ............ | G01S 7/4865 |
| 2020/0222712 A1* | 7/2020 | Schultheis | ............ | A61B 18/20 |
| 2020/0284883 A1* | 9/2020 | Ferreira | ............ | H04N 25/773 |
| 2021/0072166 A1* | 3/2021 | Uher | ............ | H04N 13/344 |
| 2021/0086364 A1* | 3/2021 | Handa | ............ | G06T 1/0014 |
| 2021/0110089 A1* | 4/2021 | Chen | ............ | G06T 7/0004 |
| 2021/0138655 A1* | 5/2021 | Mousavian | ............ | B25J 9/161 |
| 2021/0158561 A1* | 5/2021 | Park | ............ | G06T 7/74 |
| 2022/0022985 A1* | 1/2022 | Liu | ............ | G06T 7/521 |
| 2022/0032454 A1* | 2/2022 | Yang | ............ | G06V 10/764 |
| 2023/0152666 A1* | 5/2023 | Sato | ............ | G02F 1/365 |
| | | | | 359/332 |

\* cited by examiner

Original image       Undistorted image

SELF-ILLUMINATING DISTORTION HARP

FIELD OF THE DISCLOSURE

The present disclosure relates generally to the calibration of optical systems used in environment sensing. More specifically, the present disclosure pertains to the calibration of spatial sensing and acquisition found in autonomous vehicles.

BACKGROUND

An autonomous vehicle (AV) is a vehicle that is configured to navigate roadways based upon sensor signals output by sensors of the AV, wherein the AV navigates the roadways without input from a human. The AV is configured to identify and track objects (such as vehicles, pedestrians, bicyclists, static objects, and so forth) based upon the sensor signals output by the sensors of the AV and perform driving maneuvers (such as accelerating, decelerating, turning, stopping, etc.) based upon the identified and tracked objects.

The use of automation in the driving of road vehicles, such as, cars, trucks, and others, has increased as a result of advances in sensing technologies (e.g., object detection and location tracking), control algorithms, and data infrastructures. By combining various enabling technologies like adaptive cruise control (ACC), lane keeping assistance (LKA), electronic power assist steering (EPAS), adaptive front steering, parking assistance, antilock braking (ABS), traction control, electronic stability control (ESC), blind spot detection, GPS and map databases, vehicle to vehicle communication, and other, it becomes possible to operate a vehicle autonomously (i.e., with little or no intervention by a driver).

In the field of autonomous or quasi-autonomous operation of vehicles such as aircrafts, watercrafts or land vehicles, in particular automobiles, which may be manned or unmanned, sensing the surrounding of the vehicle as well as tracking objects in the surrounding of the vehicle may be considered to be crucial for sophisticated functionalities. These functionalities may range from driver assistance systems in different stages of autonomy up to full autonomous driving of the vehicle.

In certain environments, a plurality of different types of sensors for sensing the surrounding of a vehicle are used, such as monoscopic or stereoscopic cameras, light detection and ranging (LiDAR) sensors, and radio detection and ranging (radar) sensors. The different sensor types comprise different characteristics that may be utilized for different tasks.

SUMMARY

Systems and methods are provided for using a self-illuminating harp to calibrate for distortion. In particular, systems and methods are provided for imaging and analyzing self-illuminated harp in order to correct for lens distortion. In various implementations, an array of media is strung plumb which resembles a harp. The media can be light fibers or other suitable material which can be strung in a straight line. The cores of translucent fibers are illuminated. These cores of translucent fibers are configured to scatter light throughout their bulk which escapes the core by egressing along the length of fiber. This light produces plumb lines which can be imaged, analyzed and model. In some implementations, imaging is performed by rotation to include a full field-of-view (FOV).

According to one aspect of the present disclosure, a self-illuminating harp is used to calibrate for lens distortion which comprises an array of media strung plumb which resembles a harp. According to another aspect of the present disclosure, the media can be light fibers or other suitable material which can be strung in a straight line. According to another aspect of the present disclosure, the cores of translucent fibers are illuminated and are configured to scatter light throughout their bulk which escapes the core by egressing along the length of fiber. This light produces plumb lines which can be imaged, analyzed and model. In some implementations, imaging is performed by rotation to include a full FOV.

According to another aspect of the present disclosure, methods are provided for using a self-illuminating harp to calibrate for distortion comprising imaging and analyzing the self-illuminated harp in order to correct for lens distortion. According to another aspect of the present disclosure, a camera disposed on a robot arm scans the self-illuminating harp within at least part of the FOV. According to another aspect of the present disclosure, the method also can perform one or more of the following: edge detection, ignores background, looks for non-straight lines, produce a mathematical optical model, determine lens distortion, determine reprojection error, mitigates noise, and determines a suitable calibration.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

Apparatus, systems, and methods are provided for the calibration of optical systems used in environment sensing. More specifically, the present disclosure provides the calibration of spatial sensing and acquisition found in autonomous vehicles. Calibration comprises analyzing error stemming from lens distortion, at least in part. In geometric optics, distortion is a deviation from rectilinear projection, a projection in which straight lines in a scene remain straight in an image. Lens distortion is a form of optical aberration.

In optics, aberration is a property of optical systems, such as lenses, that causes light to be spread out over some region of space rather than focused to a point. Aberrations cause the image formed by a lens to be blurred or distorted, with the nature of the distortion depending on the type of aberration. Aberration can be defined as a departure of the performance of an optical system from the predictions of paraxial optics. In an imaging system, it occurs when light from one point of an object does not converge into (or does not diverge from) a single point after transmission through the system. Aberrations occur because the simple paraxial theory is not a completely accurate model of the effect of an optical system on light, rather than due to flaws in the optical elements.

Autonomous vehicles use optical systems to dynamically sense their surroundings. To different extents, optical systems all suffer from lens distortion. Typically, lens distortion can be estimated and accounted for. Parameters are estimated by minimizing the error between the camera and its numerical model on feature points identified in several views. Unfortunately, these calibration techniques have drawbacks. Specifically, the inventors of the present disclosure have found that while the estimated residual error can be apparently small, the distortion model is nevertheless not precisely estimated.

Image-forming optical systems with aberration produce images which are not spatially accurate. Spatial inaccuracies result in the misidentification of targets as well as an error in geometric location. This gives rise to dangerous conditions. Makers of optical instruments, such those found in autonomous vehicles, need to correct optical systems to compensate for aberration. In the present disclosure, aberration is analyzed with the techniques of geometrical optics.

The inventors of the present disclosure have identified numerous shortcomings found in the state of the art. Previous efforts consist of backlighting an array of lines which gave rise to undesirable effects. These include, but are not limited to, banding effects, unacceptable signal-to-noise (SNR) ratio, ineffective edge detection and glare and bias error from the diffusive background element. The inventors of the present disclosure have recognized the long felt need for a more robust calibration technique to correct for lens distortion and overcome the deficiencies of the state of the art, at least in part.

Plumb line lens distortion correction methods comprise numerical compensation between a camera internal and external parameter. Once the distortion has been corrected by the disclosed plumb line method, the calibrated camera can transform three-dimensional (3D) straight lines into two-dimensional (2D) straight lines (up to the distortion precision) thereby emulating a pinhole camera.

Example Autonomous Vehicle Configured for Environmental Optical Sensing

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick up passengers and drive the passengers to selected destinations. The vehicles can also be used to pick up packages and/or other goods and deliver the packages and/or goods to selected destinations. Autonomous vehicles rely heavily on optical systems which are accurate for classification. That is, the vehicle relies upon this analysis to distinguish between threats and benign classification of targets.

Figure 1:
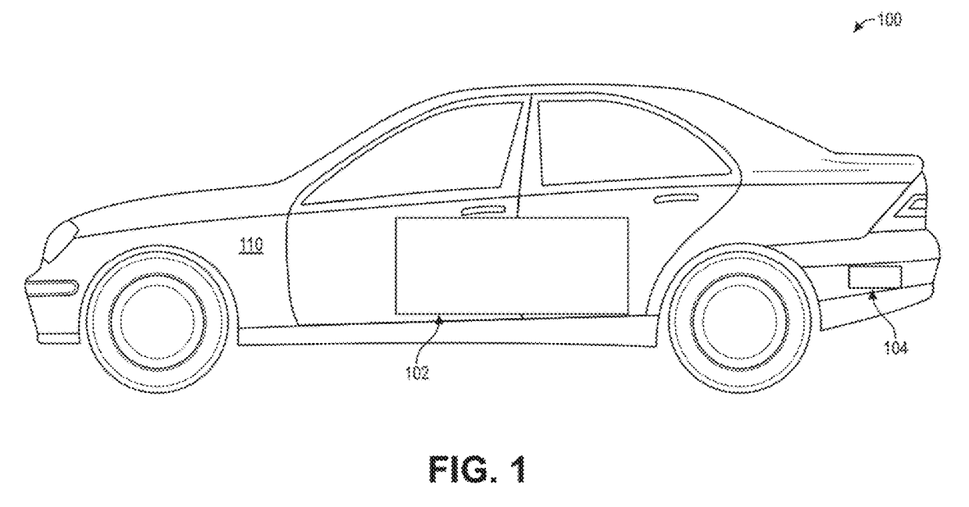
FIG. 1 is a diagram illustrating an autonomous vehicle, according to some embodiments of the disclosure.

FIG. 1 is a diagram of an autonomous driving system 100 illustrating an autonomous vehicle 110, according to some embodiments of the disclosure. The autonomous vehicle 110 includes a sensor suite 102 and an onboard computer 104. In various implementations, the autonomous vehicle 110 uses sensor information from the sensor suite 102 to determine its location, to navigate traffic, and to sense and avoid obstacles. According to various implementations, the autonomous vehicle 110 is part of a fleet of vehicles for picking up passengers and/or packages and driving to selected destinations.

The sensor suite 102 includes localization and driving sensors. For example, the sensor suite may include one or more of photodetectors, cameras, radar, sonar, LiDAR, GPS, inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment and, in some examples, sensor suite 102 data is used to detect selected events, and update a high-fidelity map. In particular, data from the sensor suite can be used to update a map with information used to develop layers with waypoints identifying selected events, the locations of the encountered events, and the frequency with which the events are encountered at the identified location. In some examples, the events include road hazard data such as locations of pot holes or debris. In this way, sensor suite 102 data from many autonomous vehicles can continually provide feedback to the mapping system and the high-fidelity map can be updated as more and more information is gathered.

The sensor suite 102 includes a plurality of sensors and is coupled to the onboard computer 104. In some examples, the onboard computer 104 receives data captured by the sensor suite 102 and utilizes the data received from the sensors suite 102 in controlling operation of the autonomous vehicle 110. In some examples, one or more sensors in the sensor suite 102 are coupled to the vehicle batteries, and capture information regarding a state of charge of the batteries and/or a state of health of the batteries.

In various examples, the sensor suite 102 includes cameras implemented using high-resolution imagers with fixed mounting and FOV. In further examples, the sensor suite 102 includes LiDARs implemented using scanning LiDARs. Scanning LiDARs have a dynamically configurable FOV that provides a point-cloud of the region intended to scan. In still further examples, the sensor suite 102 includes radars implemented using scanning radars with dynamically configurable FOV. In some examples, the sensor suite 102 records information relevant to vehicle structural health. In various examples, additional sensors are positioned within the vehicle, and on other surfaces on the vehicle. In some examples, additional sensors are positioned on the vehicle chassis.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. Based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface) and/or other interested parties (e.g., via a vehicle coordinator or a remote expert interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Example Vehicle Front With Optical Sensors

Figure 2:
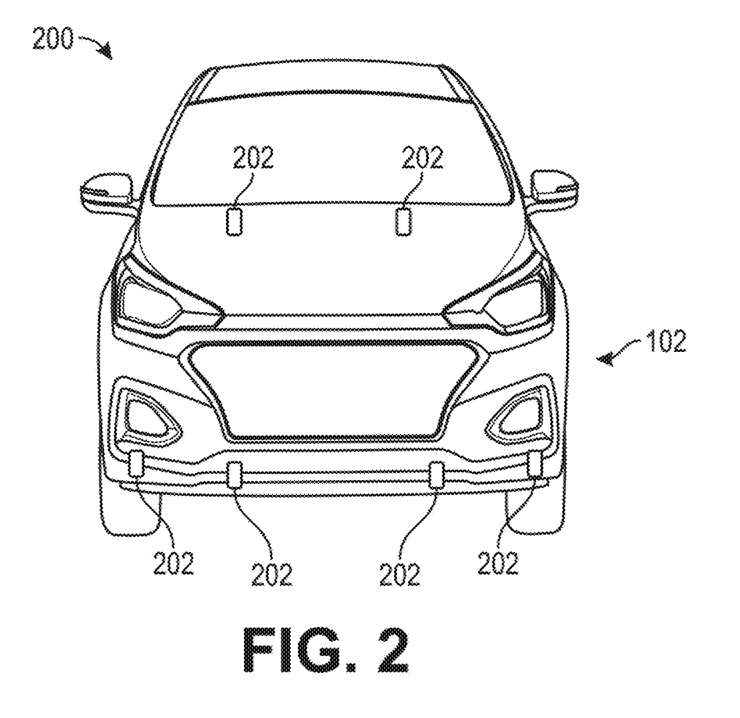
FIG. 2 is a diagram illustrating an example of an autonomous vehicle chassis having multiple optical sensors, according to various embodiments of the disclosure.

FIG. 2 is a diagram illustrating an example of a front of an autonomous vehicle 200 with multiple optical systems 202, according to various embodiments of the invention. The optical systems 202 can be positioned underneath the fascia of the vehicle, such that they are not visible from the exterior. In various implementations, more or fewer optical systems 202 are included on the autonomous vehicle 200, and in various implementations, the optical systems 202 are located in any selected position on or in the autonomous vehicle 200. The optical systems 202 measure structural integrity of the frame and other structural elements of the autonomous vehicle 200, as described above. As described above with respect to the transducers 204 of FIG. 1, in various examples, one or more of the optical systems 202 are LiDAR devices.

LiDAR is a method for determining ranges (variable distance) by targeting an object with a laser and measuring the time for the reflected light to return to the receiver. LiDAR can also be used to make digital 3D representations of areas on the earth's surface and ocean bottom, due to differences in laser return times, and by varying laser wavelengths. It has terrestrial, airborne, and mobile applications. LiDAR is an acronym of "light detection and ranging" or "laser imaging, detection, and ranging". LiDAR sometimes is called 3D laser scanning, a special combination of 3D scanning and laser scanning.

In other embodiments, other time-of-flight (ToF) systems, such as an red-green-blue (RGB) camera, can be implemented. A time-of-flight camera (ToF camera) is a range imaging camera system employing time-of-flight techniques to resolve distance between the camera and the subject for each point of the image, by measuring the round-trip time of an artificial light signal provided by a laser or a light emitting diode (LED). Laser-based time-of-flight cameras are part of a broader class of scannerless LiDAR, in which the entire scene is captured with each laser pulse, as opposed to point-by-point with a laser beam such as in scanning LiDAR systems. Time-of-flight camera systems can cover ranges of a few centimeters up to several kilometers.

In yet other embodiments, calibration techniques are applicable to optical imaging which uses light and special properties of photons to obtain detailed images. Other applications, such as, spectroscopy, are also not beyond the scope of the present disclosure.

In various implementations, additional optical systems 202 are positioned along the sides of an autonomous vehicle, and at the rear of the autonomous vehicle. These optical systems 202 may be uses as individual devices or collaboratively, as in a plurality of differing types or an array of the same type, such as, a phased array.

Responses among the various optical systems 202 are used to determine the surrounding environment and moving around with little or no human input. To that end, sensor suite 102 combines a variety of sensors to perceive vehicle surroundings, such as radar, LiDAR, sonar, GPS, odometry and IMUs. Advanced control systems interpret sensory information to identify appropriate navigation paths, as well as obstacles and relevant signage.

Example Process for Optical Systems Fusion

Figure 3:
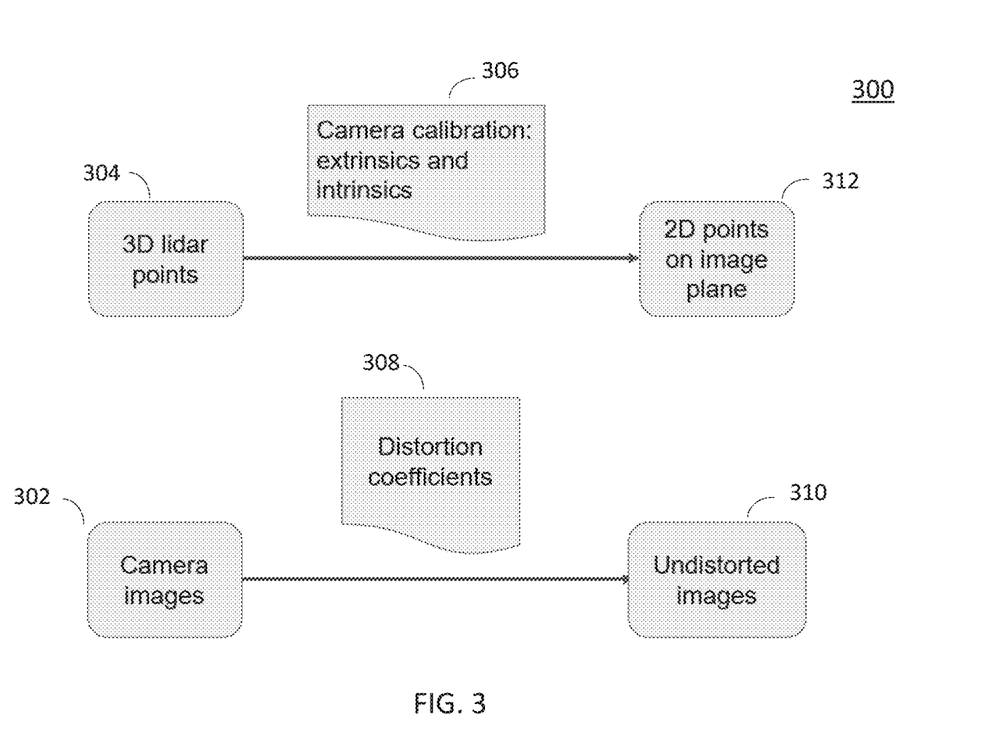
FIG. 3 is a flow chart illustrating exemplary calibration processes, according to some embodiments of the disclosure.

Sensor calibration is the process of determining the intrinsic (e.g., focal length) and extrinsic (e.g., position, orientation with respect to the environment, or to another sensor) parameters of a sensor. FIG. 3 is a flow chart illustrating exemplary calibration processes, according to some embodiments of the disclosure. The inventors of present disclosure have identified a need in the art to combine optical types as one or more optical types may be more susceptible to distortion than other. Accordingly, they propose fusing multiple optical types, such as, LiDAR with optical imaging while correcting for distortion in one or more optical types.

The need arises from the object classification. Autonomous system is required to differentiate manifold environmental targets (points of interest), from static to dynamic and benign to catastrophic. This is performed during object classification, which tends to be computationally intensive. 3D mapping comprises frames have a plurality of parameters, e.g., range, angle, velocity. Within these frames are point clouds which may or not be points of interest. The segmentation of a frame means that the single reflection points in the individual frame are assigned a meaning. For instance, reflection points may be assigned to the background of the scene, foreground of the scene, stationary objects such as buildings, walls, parking vehicles or parts of a road, and/or moving objects such as other vehicles, cyclists and/or pedestrians in the scene.

In each of the multiple frames a plurality of reflection points which may form clouds of reflection points can be detected. However, the reflection points or point clouds, respectively, in the frames do not contain a semantic meaning per se. Accordingly, a semantic segmentation of the frames is necessary in order to evaluate ("understand") the scene of the vehicle's surrounding.

The segmentation of a frame means that the single reflection points in the individual frames are assigned a meaning. This is called object classification. For instance, reflection points may be assigned to the background of the scene, foreground of the scene, stationary objects such as buildings, walls, parking vehicles or parts of a road, and/or moving objects such as other vehicles, cyclists and/or pedestrians in the scene.

These inventors of the present invention have recognized that a combination of 3D mapping with accurate optical imaging would greatly ameliorate object segmentation and classification. Process flow chart comprises collecting 3D LiDAR points 304 and camera images 302. At least one camera calibration 306 is applied thereto. Distortion effects are analyzed and coefficients are determined 308. Distortion is corrected. Undistorted images 310 are produced as the result. In one or more embodiments, these are combined with LiDAR mapping and generate 2-D points on an image plane 312.

It is highly desirable in the state of the art to have robust intrinsic calibrations. That is, optical system can deliver to the end-user with minimal extrinsic learning. A camera-LiDAR fusion augments intrinsic calibration from the manufacturer.

Example Analysis Using Geometric Optics

Figure 4:
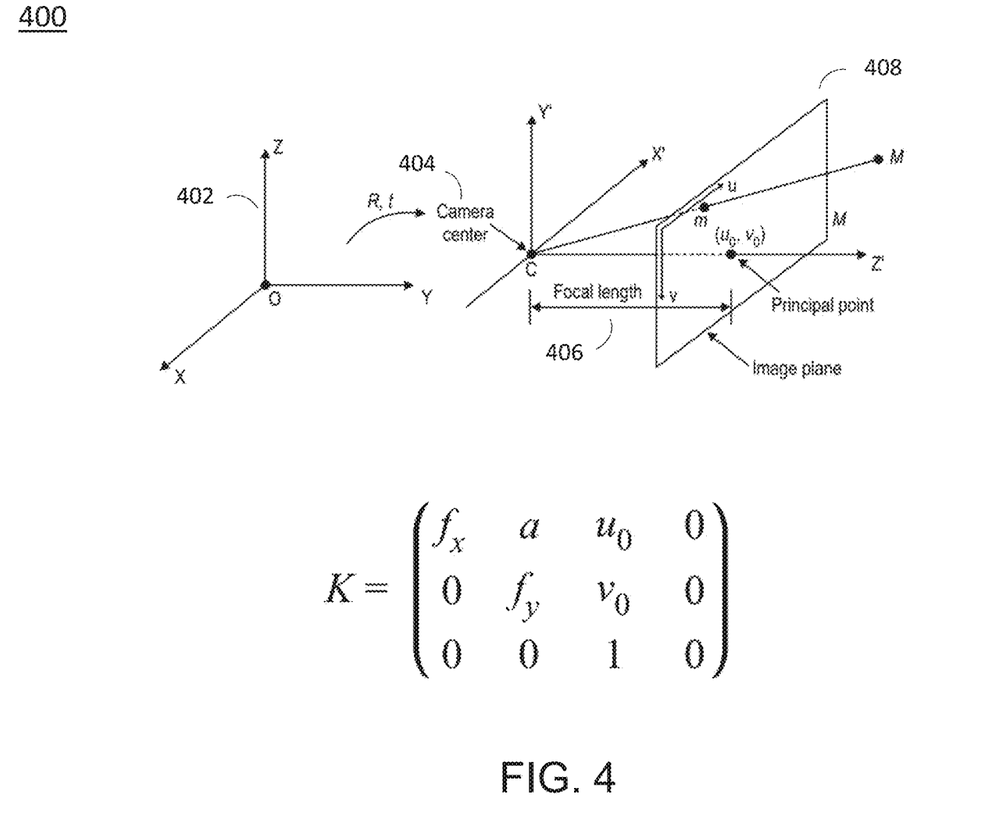
FIG. 4 is a diagram illustrating fundamental geometric optical modeling, according to some embodiments of the disclosure.

FIG. 4 is a diagram illustrating fundamental geometric optical modeling 400, according to some embodiments of the disclosure. Geometrical optics, or ray optics, is a model of optics that describes light propagation in terms of rays. The ray in geometric optics is an abstraction useful for approximating the paths along which light propagates under certain circumstances. The simplifying assumptions of geometrical optics include that light rays: propagate in straight-line paths as they travel in a homogeneous medium; bend, and in particular circumstances may split in two, at the interface between two dissimilar media; follow curved paths in a medium in which the refractive index changes; and may be absorbed or reflected.

Geometrical optics does not account for certain optical effects such as diffraction and interference. This simplification is useful in practice; it is an excellent approximation when the wavelength is small compared to the size of structures with which the light interacts. The techniques are particularly useful in describing geometrical aspects of imaging, including optical aberrations.

In the present exemplary model, a 3D coordinate system 402 is us to analytically describe the parameters of an optical system comprising a camera 404 whose lens has an inherent focal length 406 at an image plane 408.

Examples of Lens Distortion and Reprojection Error

Figure 5A:
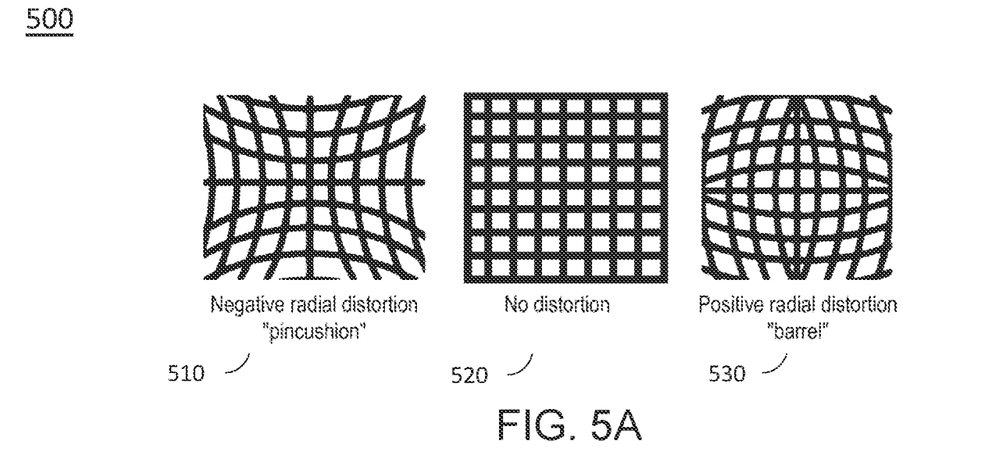
FIGS. 5A-B depict lens distortion and reprojection errors, respectively, according to some embodiments of the invention.
Figure 5B:
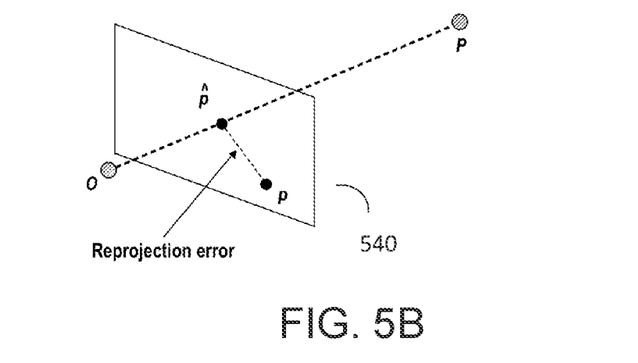

FIGS. 5A-B depict lens distortion and reprojection error 500, respectively, according to some embodiments of the invention. Although distortion can be irregular or follow many patterns, the most commonly encountered distortions are radially symmetric, or approximately so, arising from the symmetry of a photographic lens. These radial distortions can usually be classified as either barrel distortions 530 or pincushion distortions 510. No distortion 520 is included for reference.

In barrel distortion 530, image magnification decreases with distance from the optical axis. The apparent effect is that of an image which has been mapped around a sphere (or barrel). Fisheye lenses, which take hemispherical views, utilize this type of distortion as a way to map an infinitely wide object plane into a finite image area. In a zoom lens, barrel distortion appears in the middle of the lens's focal length range and is worst at the wide-angle end of the range.

In pincushion distortion 510, image magnification increases with the distance from the optical axis. The visible effect is that lines that do not go through the center of the image are bowed inwards, towards the center of the image, like a pincushion.

Projection errors 540 provide a qualitative measure of accuracy. A reprojection error is the distance between a pattern key point detected in a calibration image, and a corresponding world point projected into the same image. Stated another way, reprojection error is a geometric error corresponding to the image distance between a projected point and a measured one.

Example of a Calibration Correction System

Figure 6A:
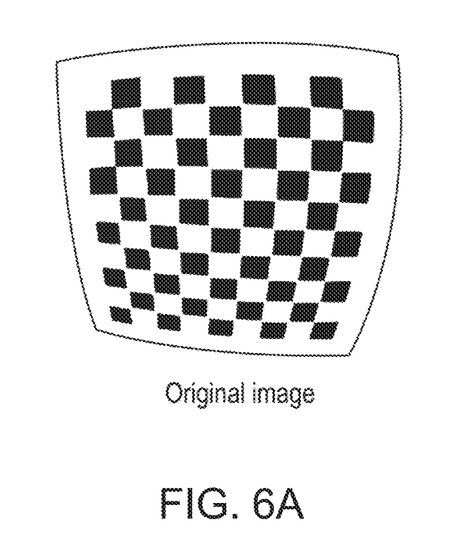
FIGS. 6A-B are diagrams illustrating a test pattern before and after correction, according to some embodiments of the invention.
Figure 6B:
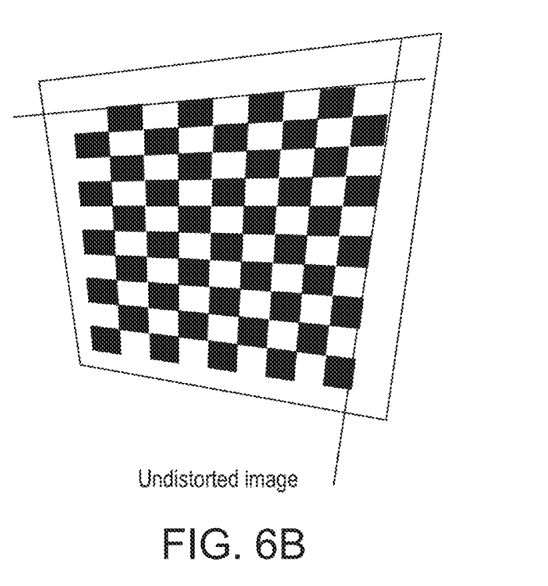

FIGS. 6A-B are diagrams illustrating a test pattern before and after correction, according to some embodiments of the invention. As can be appreciated by one of ordinary skill in the art, FIG. 6A depicts a test pattern image possibly exhibiting positive radial distortion. As the present disclosure is applicable to all common types of distortion, the specific type need not be identified.

FIG. 6B represents the same test pattern after camera calibration. Specifically, the chess board lines are now plumb—albeit not parallel which is unnecessary for correction. This is useful for most imaging (non-orthogonal) which is perspective and/or oblique. The details of the how this is achieved will now be discussed in greater detail.

Example of a Self-Illuminating Harp

Figure 7:
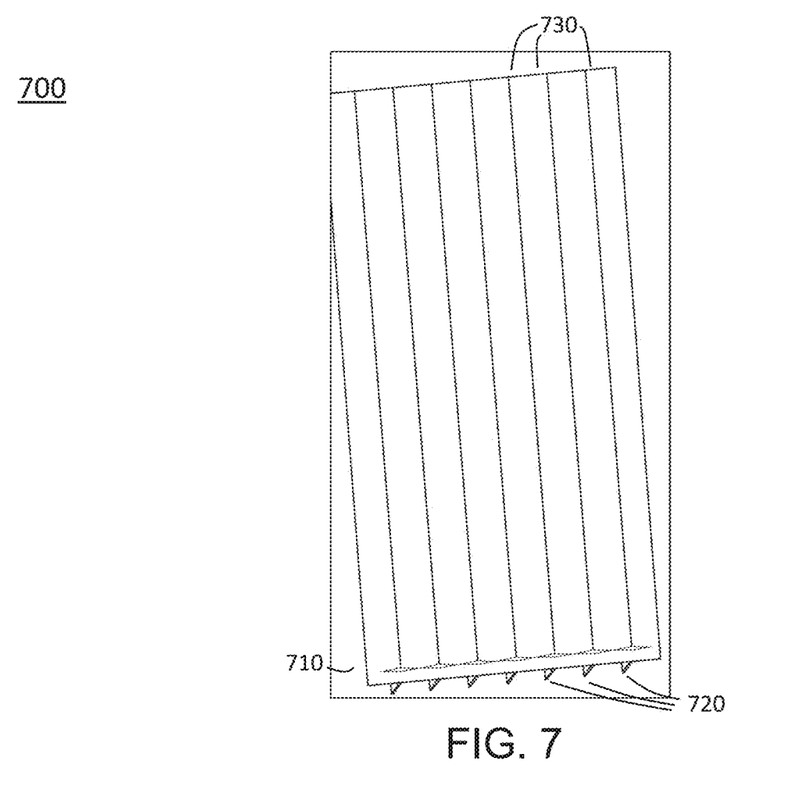
FIG. 7 shows an example embodiment of an apparatus for implementing certain aspects of the present technology.

FIG. 7 shows an example embodiment of an apparatus for implementing certain aspects of the present technology. As described herein, one aspect of the present technology is a self-illuminating harp 700 to calibrate for distortion. In one or more embodiments, self-illuminating harp 700 comprises frame 710, light sources 720, and optical media 730. Frame 710 can be any fixed, tangible plurality of members to support the optical media 730. For example, frame 710 can comprise any wood, metal or composite material. In fact, any rigid material is not beyond the scope of the present disclosure. Even semi-rigid and flexible materials having a spring constant are very plausible. For example, an archery bow strung with numerous strands/strings would work well in the present embodiment.

With that, an object of some embodiments is to produce self-illuminated plumb lines. Optical media 730 can be optical fibers. Unlike those used in fiberoptic communications which are essentially lossless in the first mode, these fibers are configured to lose light throughout their bulk. Self-illuminated plumb lines can be accomplished with a variety of different constructions and material. A translucent cladding could be applied to the core of an off the shelf single mode optical fiber. Transelectric (TE) and Transmagnetic (TM) modes which would nominally experience total internal reflection at the boundary layer(s) with lower indices of refraction would produce a scattering effect.

Internally, the scattering effect would propagate the light through its length, if the stimulated light mode was permissible by the metrics of waveguide. Externally, the scattered light illuminates the strings of the harp. Cladding thickness could be varied based on the complex impedances of the material with boundary conditions. Alternatively, the media of the core is dispersive. In this context, the core scatters incident light traveling through the medium. However, chromic dispersive media are not beyond the scope of the present invention.

In yet other embodiments, the media comprise fluorescence, such as phosphorescence. Phosphorescence is a type of photoluminescence related to fluorescence. When exposed to light (radiation) of a shorter wavelength, a phosphorescent substance will glow, absorbing the light and reemitting it at a longer wavelength. Unlike fluorescence, a phosphorescent material does not immediately reemit the radiation it absorbs. Instead, a phosphorescent material absorbs some of the radiation energy and reemits it for a much longer time after the radiation source is removed. Other fluorescence is not beyond the scope of the present invention. For example, those by the emission of light by a substance that has absorbed light or other electromagnetic radiation, which is a form of luminescence. In most cases, the emitted light has a longer wavelength, and therefore a lower photon energy, than the absorbed radiation.

Other suitable material may also be used for the media, which may be any matter state: liquid, gas, solid and even plasma. For example, the inventors contemplate using a glow stick construction, which is a self-contained, short-term light source. It consists of a translucent plastic tube containing isolated substances that, when combined, make light through chemiluminescence. Chemiluminescence (also chemoluminescence) is the emission of light (luminescence) as the result of a chemical reaction. There may also be limited emission of heat.

Non-linear media (crystals) and birefringent material also fall within scope of the present disclosure. Birefringence is the optical property of a material having a refractive index that depends on the polarization and propagation direction of light. These optically anisotropic materials are said to be birefringent (or birefractive). The birefringence is often quantified as the maximum difference between refractive indices exhibited by the material.

As previously described, an array of media is strung plumb which resembles a harp. The light fibers or other suitable material are strung into straight lines. The cores of translucent fibers are illuminated by light sources 720. In one or more embodiments, the light sources 720 is an infrared LED, such as, Short Wavelength Infrared (SWIR), Medium Wavelength Infrared (MWIR), and Long Wavelength Infrared (LWIR). However, other embodiments can have light emitting diodes having shorter wavelengths, such as that in the visible or ultraviolet regime. In yet other embodiments, a plurality of multiple wavelengths can be used. Any suitable, compact light producing device is not beyond the scope of the present disclosure—whether, broadband lamps, coherent, incandescent, incoherent bulb, lasers, or even thermal black-body radiation, etc.

Another implementation may be interspersing LEDs throughout the length of the bulk. That way, uniformity is ensured and could be used with semi-transparent scattering media. Since mode stimulation is of no consequence, fiber media could be larger. In yet another implementation, the entire length could be array of p-n junctions wired back to back. Still another implementation could include single p-n junction spanning along the length with the depletion region at its center.

To remind, an LED is implementation a semiconductor light source that emits light when current flows through it. Electrons in the semiconductor recombine with electron holes, releasing energy in the form of photons. Commonly used semiconductor materials including silicon and germanium are simple elements and junction made from these materials do not emit light. Instead compound semiconductors including gallium arsenide, gallium phosphide and indium phosphide are compound semiconductors and junctions made from these materials do emit light. These are all within the scope of the present disclosure.

While the previous implementations have tended to focused on round optical fibers, other media shapes may be more desirable particularly for augmenting SNR. For example, with the right orientation, a triangular cross-sectional area could produce a sharper, more contrasting line to distinguishing itself from the background. As such, shape of the media should not limit the present disclosure in any way.

In other embodiments, coherent lasers are configured to stimulate the bulk media along their lengths. Collimated light is partially useful, as uniform emission is desired. A key point to guarantee good imaging is effectively grabbing lines out of the background. Consequently, laser light could travel the scattering distance with little loss of power (Poynting vector), assuming good alignment. Although not all, many colors could be analyzed pursuant to the needs of the optical system, ToF, LiDAR, etc.

The inventors have recognized an advantage of using a plurality of colors, such as, RGB used in camera imaging. Upon detection, wavelengths do not all behave the same due to the dispersion relation, at least in part. That is, group and phase velocities travel at different speeds which depend on wavelength. Other chromic and spatial effects can be considered, too. For example, in an RGB camera, different color pixels may be more or less sensitive at a photodiode. Additionally, RGB pixels are separated by small distances. This may make a difference in reducing error. Accordingly, fibers can be stimulated and interrogated by a plurality of wavelengths. The result can be stored in a cloud and accessed by a manufacturer/vehicle at any time. Alternatively, light sources 720 could be broadband light sources and the color analysis could be engendered by way of filtering.

In some embodiments, one or more optical filters are chosen to match the light source. For example, if a midwave infrared (MWIR) LED is used as a light source, a dichroic filter centered between 3-5 µm could be placed over the photodetector. A dichroic filter, thin-film filter, or interference filter is a very accurate color filter used to selectively pass light of a small range of colors while reflecting other colors. By comparison, dichroic mirrors and dichroic reflectors tend to be characterized by the color(s) of light that they reflect, rather than the color(s) they pass. In some embodiments, a controller is used to control the colors presented to the fiber media.

While dichroic filters are used in the present embodiment, other optical filters are not beyond the scope of the present invention, such as, interference, absorption, diffraction, grating, Fabry-Perot, etc. An interference filter consists of multiple thin layers of dielectric material having different refractive indices. There also may be metallic layers. In its broadest meaning, interference filters comprise also etalons that could be implemented as tunable interference filters. Interference filters are wavelength-selective by virtue of the interference effects that take place between the incident and reflected waves at the thin-film boundaries. In other embodiments, a color wheel with an optical chopper can be used as a filter.

In some embodiments a collimating lens can be used to help direct light from the light source to the object and/or focus incident light to the filter. In optics, a collimator may consist of a curved mirror or lens with some type of light source and/or an image at its focus. This can be used to replicate a target focused at infinity with little or no parallax. The purpose of the collimating lens is to direct the light rays in coaxial light path towards the photodetector.

In some embodiments, photodetectors are used as transducers to sense the light, both background and produced. Photodetectors are sensors of light or other electromagnetic energy. Photodetectors have p-n junctions that converts light photons into current. The absorbed photons make electron-hole pairs in the depletion region, which is used to detect received light intensity. In some embodiments, photodetector are photodiodes or phototransistors. However, any light detecting means, e.g., avalanche, photo-multiplier tube, etc. is not beyond the scope of the present disclosure.

Example of a Rotational FOV

Figure 8:
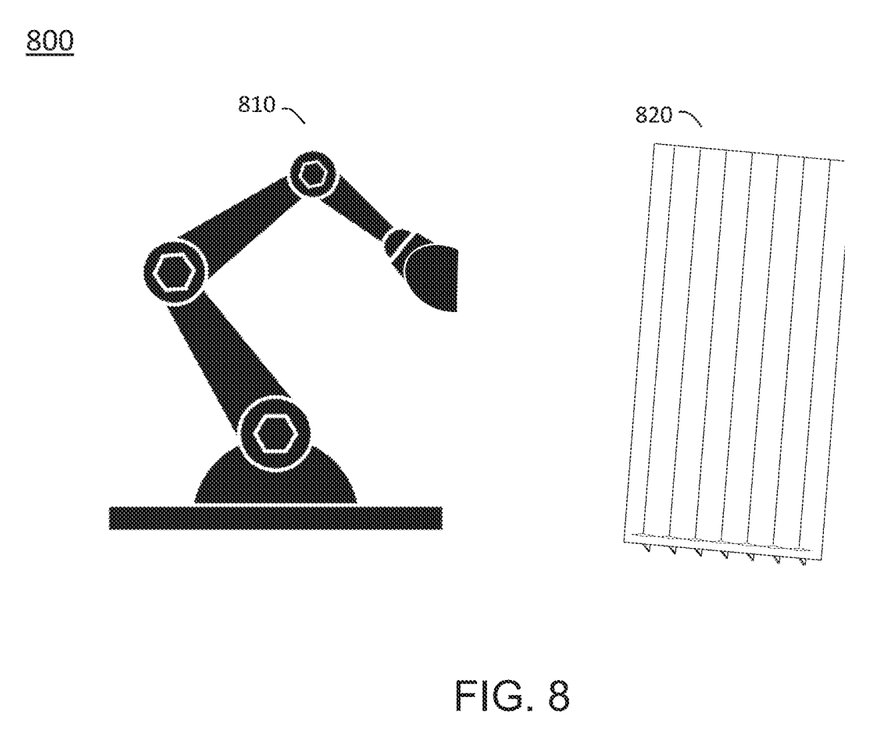
FIG. 8 shows an example embodiment of a system for implementing other aspects of the present technology.

FIG. 8 shows an example embodiment of a system 800 for implementing other aspects of the present technology. In contrast to the state of the art, the inventors of present disclosure have found that error correction is most robust by rotating the FOV. The motivation stems from the geometric optical reasoning that objects in the center of FOV typically exhibit the least distortion, while those on the edge inherit the most. According, an entire sweep of the FOV accommodates for radial difference and can correct for them in mathematical modeling. This also reduces noise. As has been demonstrated by the inventors, the order of error fitting can be lessened in degrees of order by substantial amounts, e.g., second order from higher order.

This can be accomplished but not limited to in variety of different ways. Transitioning the self-illuminating harp 820 throughout the camera's radial FOV is one technique. Another is demonstrated in FIG. 8. Specifically, a robotic arm 810 is used to rotate and scan the self-illuminating harp 820. The robotic arm 810 sweeps the entire view, in one or more dimensions, and performs line detection of self-illuminating harp 820. The robotic arm 810 can also rotate its camera around an axis which is orthogonal to the plane of the camera face.

One skilled in the art can appreciate the efficiency having robotics perform this preproduction. This provides for factory line intrinsic calibrations (at least in part) which is highly desirable for the industry. Other systems, such as, any manual and an automated are not beyond the scope of the present disclosure.

Example of a Computing System for Calibration

Figure 9:
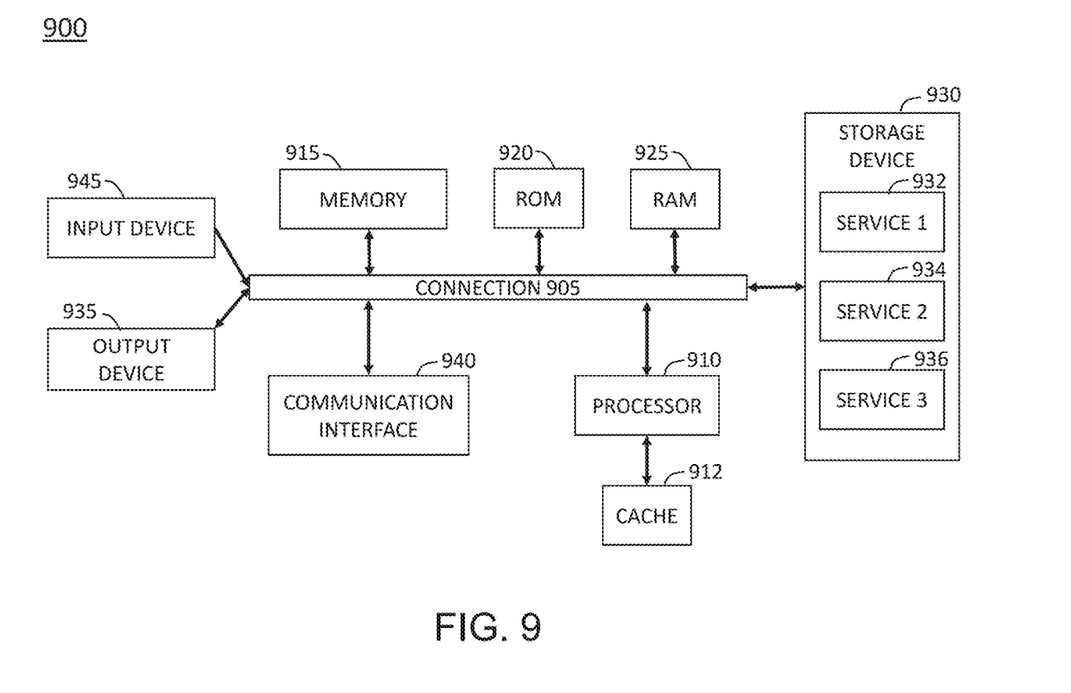
FIG. 9 shows an example embodiment of a system for implementing certain aspects of the present technology.

FIG. 9 shows an example embodiment of a computing system 900 for implementing certain aspects of the present technology. In various examples, the computing system 900 can be any computing device making up the onboard computer 94, the central computing system 902, or any other computing system described herein. The computing system 900 can include any component of a computing system described herein which the components of the system are in communication with each other using connection 905. The connection 905 can be a physical connection via a bus, or a direct connection into processor 910, such as in a chipset architecture. The connection 905 can also be a virtual connection, networked connection, or logical connection.

In some implementations, the computing system 900 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

The example computing system 900 includes at least one processing unit (e.g., central processing unit (CPU) or processor) 910 and a connection 905 that couples various system components including system memory 1015, such as read-only memory (ROM) 920 and random access memory (RAM) 925 to processor 910. The computing system 900 can include a cache of high-speed memory 912 connected directly with, in close proximity to, or integrated as part of the processor 910.

The processor 910 can include any general-purpose processor and a hardware service or software service, such as services 932, 934, and 936 stored in storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction, the computing system 900 includes an input device 945, which can represent any number of input mechanisms, such as a microphone for speech, a touch-sensitive screen for gesture or graphical input, keyboard, mouse, motion input, speech, etc. The computing system 900 can also include an output device 935, which can be one or more of a number of output mechanisms known to those of skill in the art. In some instances, multimodal systems can enable a user to provide multiple types of input/output to communicate with the computing system 900. The computing system 900 can include a communications interface 940, which can generally govern and manage the user input and system output. There is no restriction on operating on any particular hardware arrangement, and therefore the basic features here may easily be substituted for improved hardware or firmware arrangements as they are developed.

A storage device 930 can be a non-volatile memory device and can be a hard disk or other types of computer-readable media which can store data that are accessible by a computer, such as magnetic cassettes, flash memory cards, solid state memory devices, digital versatile disks, cartridges, RAMs, ROM, and/or some combination of these devices.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as a processor 910, a connection 905, an output device 935, etc., to carry out the function.

As described herein, one aspect of the present technology is the constructing, use, and application of self-illuminating lines. The present disclosure contemplates that in some instances these be manufactured using predetermined specifications. The present disclosure contemplates that light produces plumb lines which can be imaged, analyzed and model. The present disclosure contemplates error correction to be performed by rotation to include a full FOV.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

SELECT EXAMPLES

Example 1 provides an apparatus for correcting optical error comprising: a frame; a plurality of optical media strung in substantially plumb lines; and a means for illuminating the plurality of optical media; wherein the plurality of optical media is configured to externally irradiate light along their lengths.

Example 2 provides an apparatus according to one or more of the preceding and/or proceeding examples, wherein the means for illuminating the plurality of optical media is a plurality of light sources disposed at ends of the optical media.

Example 3 provides an apparatus according to one or more of the preceding and/or proceeding examples, wherein plurality of light sources are LEDs.

Example 4 provides an apparatus according to one or more of the preceding and/or proceeding examples, wherein the means for illuminating the plurality of optical media is luminescent comprised by the optical media.

Example 5 provides an apparatus according to one or more of the preceding and/or proceeding examples, wherein the means for illuminating the plurality of optical media produces coherent light.

Example 6 provides an apparatus according to one or more of the preceding and/or proceeding example, wherein the means for illuminating the plurality of optical media comprises more than one wavelength.

Example 7 provides an apparatus according to one or more of the preceding and/or proceeding examples, wherein the plurality of optical media are optical fibers configured to scatter light.

Example 8 provides an apparatus according to one or more of the preceding and/or proceeding examples, wherein the plurality of optical media has a cladding configured to scatter light.

Example 9 provides a method for correcting lens distortion comprising: illuminating an array of optical elements which are arranged plumb and configured to scatter light throughout their bulk; receiving the scattered light at a light sensing device; imaging the received light; rotating at least one of the array and light sensing device relative to one another; and analyzing the image for lens distortion.

Example 10 provides a method according to one or more of the preceding and/or proceeding examples, further comprising correcting for the lens distortion.

Example 11 provides a method according to one or more of the preceding and/or proceeding examples, wherein the rotation comprises a field-of-view.

Example 12 provides a method according to one or more of the preceding and/or proceeding examples, further comprising edge detecting.

Example 13 provides a method according to one or more of the preceding and/or proceeding examples, wherein the edge detecting includes identifying the array of optical elements.

Example 14 provides a method according to one or more of the preceding and/or proceeding examples, wherein the illumination is produced by a plurality of light sources disposed at the ends of the optical elements.

Example 15 provides a method according to one or more of the preceding and/or proceeding examples, wherein the plurality of light sources comprise a plurality of colors.

Example 16 provides a method according to one or more of the preceding and/or proceeding examples, wherein the plurality of light sources emits incoherent light.

Example 17 provides a method according to one or more of the preceding and/or proceeding examples, wherein the optical elements are luminescent, at least in part.

Example 18 provides a method according to one or more of the preceding and/or proceeding examples, wherein the optical elements comprise a coating which is configured to perform the scattering.

Example 19 provides a method according to one or more of the preceding and/or proceeding examples, further comprising comparing images resulting from the rotation.

Example 20 provides a system for calibrating optical systems comprising: a self-illuminating harp comprising: a frame; a plurality of optical fibers strung in substantially plumb lines; and a plurality of light sources configured to illuminate the plurality of optical fibers; wherein the plurality of optical fibers is configured to externally irradiate light along their lengths; and a robot having a camera configured to sweep the self-illuminating harp.

Variations and Implementations

As will be appreciated by one skilled in the art, aspects of the present disclosure, in particular aspects of a perception system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A system comprising:
   a self-illuminating harp comprising:
      a frame;
      a plurality of optical media strung in substantially plumb lines; and
      a plurality of light sources to illuminate the plurality of optical media;
      wherein the plurality of optical media is to externally irradiate light along their lengths; and
   a robot having a camera to sweep the self-illuminating harp.

2. The system of claim 1, wherein the plurality of light sources are disposed at ends of the plurality of optical media.

3. The system of claim 2, wherein the plurality of light sources are light emitting diodes.

4. The system of claim 1, wherein plurality of light sources produce coherent light.

5. The system of claim 1, wherein the means for illuminating the plurality of optical media comprises more than one wavelength.

6. The system of claim 1, wherein the plurality of optical media are optical fibers configured to scatter light.

7. The system of claim 1, wherein the plurality of optical media has a cladding configured to scatter light.

8. A method for correcting lens distortion comprising:
   illuminating an array of optical elements which are arranged plumb and to scatter light throughout bulk of the optical elements;
   receiving the scattered light at a light sensing device;
   imaging the received scattered light;
   rotating at least one of the array of optical elements and light sensing device relative to one another; and
   analyzing the image for lens distortion.

9. The method of claim 8, further comprising correcting for the lens distortion.

10. The method of claim 8, further comprising edge detecting.

11. The method of claim 9, wherein edge detecting includes identifying the array of optical elements.

12. The method of claim 8, wherein the rotating comprises rotating a field-of-view.

13. The method of claim 8, wherein the illuminating is performed by a plurality of light sources disposed at the ends of the optical elements.

14. The method of claim 13, wherein the plurality of light sources comprise a plurality of colors.

15. The method of claim 13, wherein the plurality of light sources emit incoherent light.

16. The method of claim 8, wherein the optical elements are luminescent, at least in part.

17. The method of claim 8, wherein the optical elements comprise a coating which is configured to perform the scattering.

18. The method of claim 8, further comprising comparing images resulting from the rotation.

19. A system for calibrating optical systems comprising:
    a self-illuminating harp comprising:
       a frame;

a plurality of optical fibers strung in substantially plumb lines; and
a plurality of light sources to illuminate the plurality of optical fibers;
wherein the plurality of optical fibers is to externally irradiate light along their lengths; and
a robot having a camera to sweep the self-illuminating harp.

* * * * *